Feb. 27, 1923. 1,446,783.
A. CALINAUD.
APPARATUS FOR GIVING WARNING OF AND AFFORDING PROTECTION AGAINST FROST.
FILED JUNE 25, 1921. 2 SHEETS—SHEET 1.
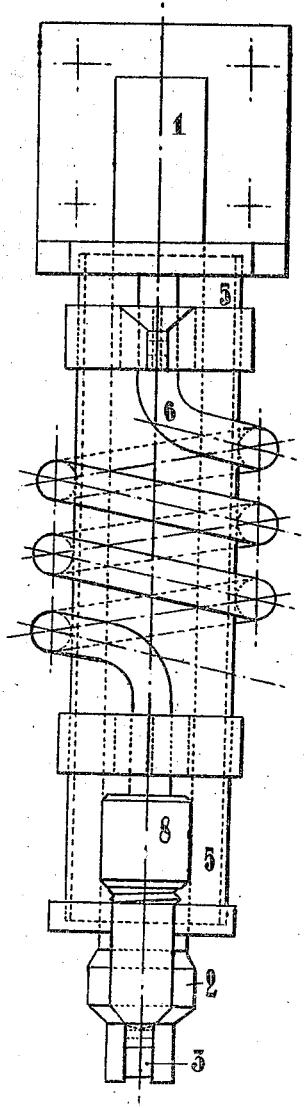
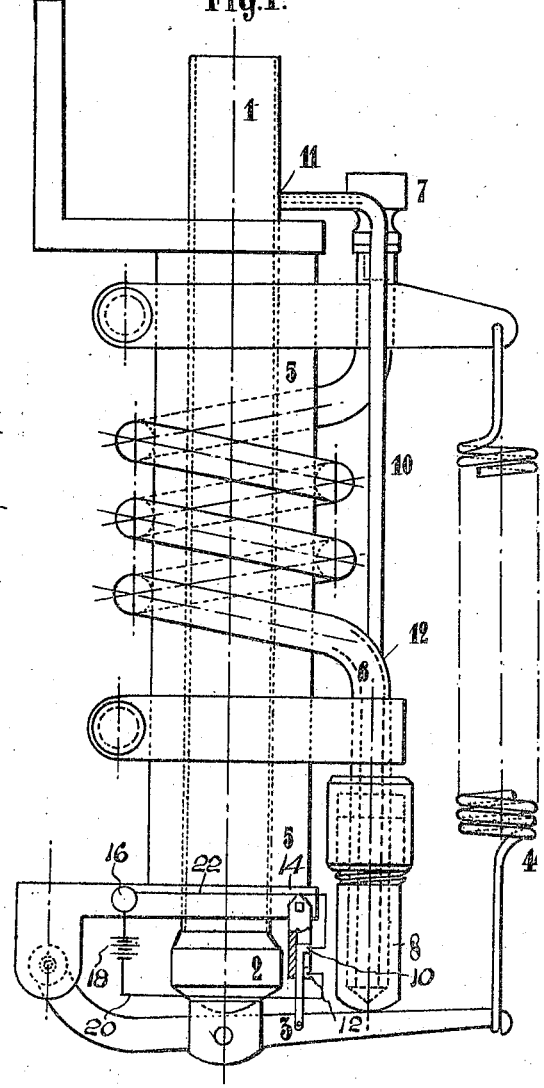

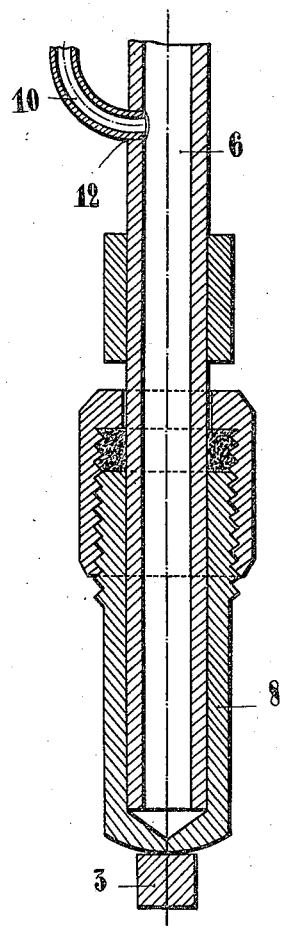

Patented Feb. 27, 1923.

1,446,783

UNITED STATES PATENT OFFICE.

ARNOLD CALINAUD, OF BOURGANEUF, CREUSE, FRANCE.

APPARATUS FOR GIVING WARNING OF AND AFFORDING PROTECTION AGAINST FROST.

Application filed June 25, 1921. Serial No. 480,496.

*To all whom it may concern:*

Be it known that I, ARNOLD CALINAUD, citizen of the Republic of France, and resident of Bourganeuf, Creuse, France, have invented a new and useful Apparatus for Giving Warning of, and Affording Protection Against Frost, which apparatus is fully set forth in the following specification.

The present invention has reference to an apparatus for giving warning of, and affording protection against frost.

The object of this apparatus is to prevent, in most cases, the damage caused by the freezing of water in pipes, cisterns, parts of machinery, and, speaking generally, in plants and installations of all kinds containing water.

This apparatus has, furthermore, for its object to give a warning, in any suitable manner, for example, electrically, of the exact moment when the frost or ice begins to get dangerous.

By way of example the arrangement will be described in its application to the discharge pipe of a cooling water circulation used for a benzine motor.

In the accompanying drawings:

Figure 1 is a front view of the apparatus;

Fig. 2 is a side elevation thereof;

Fig. 3 is a sectional view of a part of the apparatus.

In these drawings, —1— is a pipe to be connected, by means of rubber tubing faced with canvas (not shown), to the lowest portion of the whole apparatus it is desired to protect. The duty of this tube or pipe is to serve as a discharge means.

At its lower end, the tube —1— is provided with a valve —2— articulated to the lever —3—; this valve is held upon its seating by means of a spring —4— which acts upon one of the ends of the lever.

Around the first pipe and completely enveloping it, there is placed a second tube or pipe —5— closed at both ends and forming an insulating air jacket. This second tube serves as a support for the apparatus properly so-called. This latter is composed of a reservoir in the form of a length of metallic tubing 6 of small diameter having thick walls and forming a coil. This tube is closed at its upper end by means of a screw-plug —7— and, at its lower end, by a movable plug 8 with a stuffing box.

The augmentation of the volume of water contained in the tubing 6, under the very rapid action of frost in this arrangement is the cause which leads to the displacement of the plug —8— acting as a piston. This latter engaging, in its turn, during its throw the lever —3— will move it progressively and, together with it, the closing valve —2— enabling the whole of the piping controlled by the valve to be emptied.

The whole arrangement of essential members for emptying the protected piping is completed by the very small feed pipe —10— connected at —11— to the tube —1— and at —12— to the coil —6—.

Preferably a sound warning is also given as for example by the ringing of a bell, of the danger of the freezing of water in the installation protected by the apparatus of this invention. As shown, this is effected by means including electrically insulated contact members 10 and 12 connected respectively to the lever 3 and the fixed part 14 of the apparatus. Supported on the part 14 is a bell 16, in circuit on one side with a battery 18 and a wire 20 connected with the contact member 12, and on the other side with a wire 22, connected with the contact member 10. With this construction the bell 16 will be caused to ring whenever the plug 8 is forced downwardly far enough to bring the contact member 10, into engagement with the contact member 12. Manifestly, if desired the lever 3 may be disconnected from the valve 2 and the apparatus so arranged so as to give warning of damage by freezing without emptying the water from the protected installation.

The apparatus once installed and the first filling having been effected by unscrewing the plug —7— so as to enable the air contained in the apparatus to escape, the method of operation will be as follows:

The feed pipe 10 being of less diameter than the coil 6, and having thinner walls first gets full of ice and insulates the coil that is, it prevents the water in the coil from moving backwardly in the feed pipe. The water in the coil, being able to expand only in the longitudinal direction, forces down the plug —8— and releases the valve —2—, thus causing the discharge of the still unfrozen water contained in the members to be protected.

The coil 6 is of great length in proportion with its width, in consequence of which the coil may be made of relatively small capacity and the water in the coil nevertheless may be caused to undergo a considerable linear expansion as it begins to freeze. With this construction the movement of the plug 8 is so extensive that it may be easily and reliably utilized either to give warning or to empty the water from the protected installation or both. In the illustrated apparatus, the plug 8, will be lowered an inch or more upon freezing of the water in the coil.

The provision of the screw plug 7, enables the air to be completely exhausted from the coil 6, so that the coil may be entirely filled with water, and the feed pipe 11 being normally open and connected to the discharge pipe 1, insures that the coil 6 will be kept full of water at all times. It will be obvious that if the coil 6 were not entirely filled with water in the first instance, or if it were not kept full, the water in the coil might freeze without the consequent expansion of the water resulting in movement of the plug 8 and lever 3. In such a case the water in the protected installation might be frozen without the valve 2, having been opened, or any warning given of any danger of damage from frost.

As will be clearly understood the form and arrangements of the apparatus will vary according to different applications; those which have been described have been given merely by way of examples.

Having now particularly described and ascertained the nature of my said invention and in what manner the same is to be performed, I declare that what I claim is:

1. An apparatus for protecting water installations against frost, comprising a normally closed discharge member through which the water in the protected installation may be withdrawn, a coil of piping surrounding the discharge member and closed at its upper end, and a member mounted on the lower end of the coil and adapted to be moved relatively to the coil when the temperature of the water in the installation approaches the freezing point.

2. An apparatus for protecting water installations against frost, comprising a coil of piping closed at its upper end and so constructed that the water in the piping will be frozen before the water in the protected installation, means for normally establishing liquid communication between the coil of piping and the water circulating system of the protected installation, said means being constructed so as to cause liquid communication between the piping, and said installation to be broken by the formation of ice in said means before the water in the piping is frozen, and a member mounted on the lower end of the coil of piping and adapted to be moved relatively to the piping when the temperature of the water in the installation approaches the freezing point.

3. An apparatus for protecting water installations against frost, comprising a water container so constructed that the water in the container will be frozen before the water in the protected installation, a closure in the upper end of said container adapted to be removed so as to enable the air to be completely exhausted from the container, thus permitting the container to be entirely filled with water, means for establishing liquid communication between the container and the water circulating system of the installation at a low point of the system, so as to cause the container to be kept full of water, said means being constructed so as to cause liquid communication between the container and said installation to be broken by the formation of ice in said means before the water in the container is frozen, mechanism for controlling the discharge of water from said installation, and a member mounted on the container and operable on said discharge controlling mechanism to cause the water to be emptied from the installation when the water in the piping is expanded by frost.

4. An apparatus for protecting water installations against frost, comprising a discharge member for the installation and a water container of great length compared with its transverse dimensions so as to cause the water in the container to undergo a large amount of linear expansion under the action of frost said water container communicating with said discharge member, and means for utilizing the linear expansion of the water to protect the installation against damage by frost.

5. An apparatus for protecting water installations against frost, comprising a water container, communicating means between the water container and a low point of the water circulating system of the installation so as to cause the water container to be kept full of water at all times, said container being constructed with an opening in its upper end normally closed by a removable closure so as to enable the air to be completely exhausted from the container, thus permitting the container to be entirely filled with water, and means for utilizing the linear expansion of the water to protect the water installation against damage by frost.

6. An apparatus for protecting water installations against frost, comprising an insulated discharge member, adapted for communication with the lowest point of the protected installation, a valve in the discharge member for controlling the discharge of water from the protected installation, a coil of piping surrounding the discharge member, a closure at the upper end of the coil of piping adapted to be opened to permit the air to be completely exhausted from the piping, thus permitting the piping to be entirely filled with water, a pipe for normally establishing fluid communication between the coil of piping and the discharge member so as to cause the piping to be kept full of water, said pipe being so constructed that water will freeze in it sooner than in the coil of piping so that the liquid communication between the piping and the installation is broken by the formation of ice in said pipe before the water in the piping begins to freeze, and a member mounted on the coil of piping and operable on the valve of the discharge member, to cause said valve to be opened when the water in the piping is expanded by frost.

In testimony whereof I have signed this specification in the presence of two subscribing witnesses.

ARNOLD CALINAUD.

Witnesses:
R. H. WILIAMS,
WILLEGOUREIE.